(12) United States Patent  (10) Patent No.: US 9,131,472 B2
Cheng et al.  (45) Date of Patent: Sep. 8, 2015

(54) SYSTEMS AND METHODS TO PROVISION QUALITY OF SERVICE SENSITIVE DEVICES IN WIRELESS LOCAL AREA NETWORKS

(71) Applicant: FutureWei Technologies, Inc., Plano, TX (US)

(72) Inventors: Ho-Ting Cheng, Stittsville (CA); Osama Aboul-Magd, Kanata (CA); Sheng Sun, Kanata (CA); Junghoon Suh, Kanata (CA); Ngoc-Dung Dao, Ottawa (CA); Alex Stephenne, Stittsville (CA)

(73) Assignee: Futurewei Technologies, Inc., Plano, TX (US)

( * ) Notice: Subject to any disclaimer, the term of this patent is extended or adjusted under 35 U.S.C. 154(b) by 159 days.

(21) Appl. No.: 13/894,257

(22) Filed: May 14, 2013

(65) Prior Publication Data

US 2013/0308447 A1  Nov. 21, 2013

Related U.S. Application Data

(60) Provisional application No. 61/648,179, filed on May 17, 2012.

(51) Int. Cl.
*H04W 74/02* (2009.01)
*H04W 28/26* (2009.01)
(Continued)

(52) U.S. Cl.
CPC ............ *H04W 74/02* (2013.01); *H04W 28/26* (2013.01); *H04W 36/14* (2013.01); *H04W 72/0446* (2013.01); *H04W 74/04* (2013.01); *H04W 74/08* (2013.01); *H04W 84/12* (2013.01)

(58) Field of Classification Search
CPC ......... H04L 47/10; H04L 47/11; H04L 47/12; H04L 47/13; H04L 2012/5631; H04L 2012/5632; H04L 2012/5633; H04L 2012/5634

USPC ......... 370/229, 230, 216, 449, 346, 338, 328, 370/329
See application file for complete search history.

(56) References Cited

U.S. PATENT DOCUMENTS

2003/0169763 A1  9/2003  Choi et al.
2004/0253996 A1  12/2004  Chen et al.
(Continued)

FOREIGN PATENT DOCUMENTS

CN  1574829 A  2/2005
CN  1640063 A  7/2005
CN  1783768 A  6/2006

OTHER PUBLICATIONS

"IEEE Std 802.11, IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications," IEEE Computer Society, Mar. 29, 2012, 2,793 pages.

(Continued)

*Primary Examiner* — Dady Chery
(74) *Attorney, Agent, or Firm* — Slater & Matsil, L.L.P.

(57) ABSTRACT

System and method embodiments are provided for provisioning a quality of cellular user experience (QoE) or quality of service (QoS) specified device in a wireless local area network (LAN). The embodiments enable a QoE or QoS specified by a service agreement for a device to be maintained during periods when the device is transmitting data to and receiving data from the wireless LAN (e.g., a WiFi hotspot). In an embodiment, a method includes determining that at least one QoS-sensitive device is communicating with a wireless LAN access point (AP), reserving a contention free period (CFP) in a superframe for the at least one QoS-sensitive device to communicate with the AP, and allocating a contention period (CP) in the superframe for non-QoS-sensitive devices to communicate with the AP, wherein the non-QoS-sensitive devices are prohibited from transmitting during the CFP.

31 Claims, 5 Drawing Sheets

(51) Int. Cl.
  *H04W 72/04* (2009.01)
  *H04W 74/04* (2009.01)
  *H04W 74/08* (2009.01)
  *H04W 84/12* (2009.01)
  *H04W 36/14* (2009.01)

(56) References Cited

U.S. PATENT DOCUMENTS

2005/0190731 A1* 9/2005 Bejerano et al. ............. 370/338
2006/0126497 A1* 6/2006 Na et al. ...................... 370/216

OTHER PUBLICATIONS

International Search Report and Written Opinion of the International Searching Authority received in Patent Cooperation Treaty Application No. PCT/CN2013/075829, mailed Aug. 29, 2013, 10 pages.

European Search Report of the European Patent Office received in Patent Cooperation Treaty Application No. 13791024.6-1857/2847941; PCT/CN2013/075829, mailed Apr. 9, 2015, 6 pages.

Liang, H. et al., "DFMAC: DTN-Friendly Medium Access Control for Wireless Local Area Networks Supporting Voice/Data Services," IEEE International Conference on Communications and Networking in China (CHINACOM), Oct. 1, 2011, 14 pages.

Orfanos, G. et al., "A Centralized MAC Protocol with QoS Support for Wireless LANs," The 18th Annual IEEE International Symposium on Personal, Indoor and Mobile Radio Communications, (PIMRC'07), Sep. 3-7, 2007, 6 pages.

Song, B. et al., "Downlink Optimization of Indoor Wireless Networks Using Multiple Antenna Systems," Twenty-third Annual Joint Conference of the IEEE Computer and Communications Societies, INFOCOM 2004, vol. 4, Mar. 7-11, 2004, 12 pages.

* cited by examiner

SYSTEMS AND METHODS TO PROVISION QUALITY OF SERVICE SENSITIVE DEVICES IN WIRELESS LOCAL AREA NETWORKS

CROSS-REFERENCE TO RELATED APPLICATIONS

The present application claims the benefit of U.S. Provisional Patent Application No. 61/648,179 filed May 17, 2012 entitled "Method and System to Provision QoE in Wireless LANs," which is incorporated herein by reference as if reproduced in its entirety.

TECHNICAL FIELD

The present invention relates to a method and system for wireless communications, and, in particular embodiments, to a method and system to provision quality of user experience (QoE) in wireless local area networks (LANs).

BACKGROUND

The media access control (MAC) protocol generally provides addressing and channel access control mechanisms in a network. The Institute of Electrical and Electronics Engineers (IEEE) 802.11 distributed coordination function (DCF) has a very simple contention-based MAC that provides best-effort service, and there is no quality of service (QoS) support for user equipment (UEs)/stations (STAs) in WiFi. IEEE 802.11e enhanced distributed channel access (EDCA) has a simple contention-based MAC that offers only traffic differentiation (i.e., very limited QoS support) to UEs/STAs in WiFi, because those UEs compete with local UEs following the same contention-based MAC. Some polling-based mechanisms (e.g., IEEE 802.11 Point Coordination Function (PCF), Wi-Fi scheduled multimedia (WSM)) try to provision QoS, by polling and allocating channel resources to every STA. This however causes a lot of protocol overhead, leading to poor resource utilization.

SUMMARY OF THE INVENTION

In accordance with an embodiment, a method for provisioning quality of service (QoS)-sensitive devices in a wireless local area network (LAN) includes determining that at least one QoS-sensitive device is communicating with a wireless LAN access point (AP), reserving a contention free period (CFP) in a superframe for the at least one QoS-sensitive device to communicate with the AP, and allocating a contention period (CP) in the superframe for non-QoS-sensitive devices to communicate with the AP, wherein the non-QoS-sensitive devices are prohibited from transmitting during the CFP.

In accordance with another embodiment, a network component configured provisioning quality of service (QoS)-sensitive devices in a wireless local area network (LAN) includes a processor and a computer readable storage medium storing programming for execution by the processor, the programming including instructions to: determine that at least one QoS-sensitive device is communicating with a wireless LAN access point (AP), reserve a contention free period (CFP) in a superframe for the at least one QoS-sensitive device to communicate with the AP, and allocate a contention period (CP) in the superframe for non-QoS-sensitive devices to communicate with the AP, wherein the non-QoS-sensitive devices are prohibited from transmitting during the CFP.

In accordance with another embodiment, a method for provision quality of cellular user experience (QoE) in a wireless local area network (LAN) includes scheduling a cellular device to transmit/receive data to/from an access point (AP) of the wireless LAN during a contention free period (CFP) and scheduling a non-cellular device to transmit/receive to/from the access point only during a contention period (CP).

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
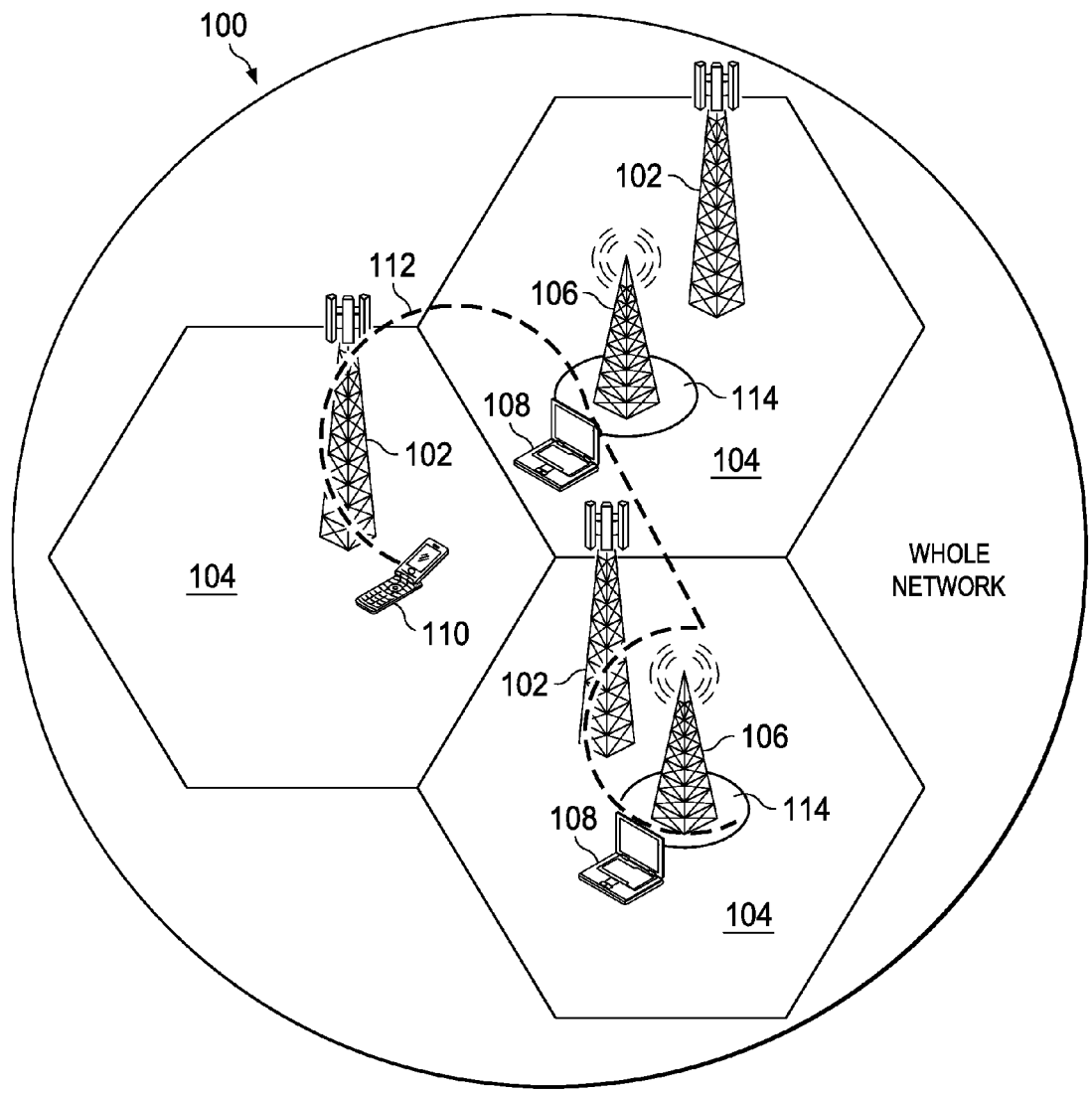
FIG. 1 illustrates a system for provisioning QoS-sensitive UEs in a Wireless LAN.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In a disclosed embodiment, a method of quality of service (QoS) provisioning for QoS-sensitive user equipment (UEs) (e.g., cellular rich UEs), with WiFi radio interface, connected to at least one WiFi access point (AP) includes communicating in a super-frame time period, wherein the super-frame comprises a beacon period, a contention-free period dedicated to provisioning the QoS of the QoS-sensitive UEs, and a contention period using a default media access control (MAC) for local stations (STAs) and dedicated to one or more of local WiFi STAs and QoS-insensitive UEs. In a further embodiment, the method includes the AP sending a beacon message during the beacon period containing information related to UE scheduling in the CFP, for example one or more of tokens, token holders, token passing mechanisms, the contention-free period (CFP), and the contention period (CP). In a further embodiment, the method includes using a scheduled based access such as token-based MAC scheme in the contention-free period for provisioning the QoS of the QoS-sensitive UEs. In a further embodiment, there is an upper bound on a number of tokens, wherein the upper bound is configured based on one or more factors selected from the group consisting of agreement between vendors/service providers of at least one radio access technology and WiFi vendors/service providers, QoS requirements of QoS-sensitive UEs, number of QoS-sensitive UEs in the WiFi zone, number of local UEs, and combinations thereof. In a further embodiment, there is an upper bound on a number of token passing times or the total air times for CFPs.

An embodiment method of updating a radio resource management (RRM) strategy by an RRM manager includes receiving an information message from an access point (AP) indicating performance of a UE, updating the RRM strategy in accordance with the information message, and triggering a new RRM policy to the UE. In a further embodiment, the information message includes one or more of a QoE performance of QoS-sensitive UEs, token information, and total duration of CFPs.

An embodiment method provisions QoS of QoS-sensitive UEs while they are connected to a WiFi access point (AP). In one embodiment, these QoS-sensitive UEs are cellular-enabled UEs whose traffic is QoS-sensitive. The medium access control (MAC) protocol assigns a dedicated contention-free period for the QoS-sensitive flows of some UEs (referred to as QoS-sensitive UEs) so that their QoS requirements can be met, while a contention period is allocated to local WiFi STAs and the QoS-insensitive flows of some UEs (referred to as QoS-insensitive UEs) following standard legacy MAC. An embodiment ensures QoS support for QoS-sensitive UEs when their traffic traverses a WiFi network. Embodiments may be applied to IEEE 802.11-enabled access points and mobile stations with at least one radio interface. The radio interfaces include some WiFi interface, some cellular technology interface, etc.

An embodiment method determines a time duration of the CFP and the CP, where the time duration of the CP is what remains of the superframe after the CFP and beacon time period have been determined. The time durations of superframe and the CFP can vary depending on different factors, such as, the number of QoS-sensitive UEs and the required QoS for the QoS-sensitive UEs.

An embodiment assigns higher priority to QoS-sensitive UEs when connected to WiFi hotspots to provision their QoS. In one embodiment, these QoS-sensitive UEs are cellular-enabled UEs whose traffic is QoS-sensitive. In an embodiment, a QoS-sensitive UE that is currently assigned to or transmitting during CFPs is demoted to transmitting during the CPs when a new QoS-sensitive UE that has a higher QoS requirement joins the WiFi hotspot.

An embodiment assigns higher priority to QoS-sensitive UEs when connected to WiFi hotspots to provision their QoS. An embodiment assigns a contention-free phase for QoS-sensitive UEs. This information is broadcast by a WiFi AP, which can be easily detected. An embodiment scheduled-based access such as token-based MAC provisions the QoS of QoS-sensitive UEs while they are connected to a WiFi AP in a WiFi hotspot, and yet maintains the default operation for local UEs for contention. The maximum number of tokens and the duration of the contention-free period (CFP) can be configured to suit different use cases. The token-based MAC performance can improve a radio resource management (RRM) mechanism via an embodiment token-based MAC.

In an embodiment, beacon frame content is modified because an AP puts the information of the UEs schedule such as tokens, CFP, contention period (CP), token passing mechanism, etc., in a beacon message. In CFP, a MAC frame includes a token if piggybacked, or a separate message containing this token is announced by an AP. In an embodiment, operators and/or wireless service providers can see the same or improved quality of user experience when UEs handover from their network(s) (e.g., cellular networks) to WiFi or receive data from WiFi APs. In one embodiment where one radio access technology is cellular technology, an embodiment provides incentive for cellular base stations to offload traffic to WiFi APs without compromising the QoE of QoS-sensitive cellular UEs. An embodiment helps improve an inter-radio access technologies (RAT) RRM mechanism.

In an embodiment, wherein QoS-sensitive UEs are cellular UEs, FIG. 1 illustrates an embodiment system 100 for provisioning QoS-sensitive UEs in a Wireless LAN. In an embodiment, the wireless LAN is a WiFi hotspot 114. The system 100 includes cellular base stations (BSs) 102, WiFi access points (APs) 106 and an associated WiFi hotspot 114 or coverage area, local UEs 108 served by WiFi, and a number of cellular UEs 110 with dual cellular-WiFi radio interfaces. The BSs 102 each have a coverage area or cell 104.

The AP 106 may comprise any component capable of providing wireless access by, inter alia, establishing uplink and/or downlink connections with the UEs 110. In an embodiment, the AP 106 conforms supports the IEEE 802.11 standard. The UEs 110 may comprise any component capable of establishing a wireless connection with the AP 106.

The cellular UE 110 may travel a path 112 from one BS coverage area 104 through other BS coverage areas 104 to a WiFi hotspot 114 served by a WiFi AP 106. There is no or only limited QoS support in the standard 802.11 MAC, so cellular UEs 110 cannot enjoy the same quality of experience (QoE) when their traffic flow traverses the 802.11 networks. Therefore an embodiment provides reservation-based MAC to provision QoS to cellular users. Cellular UEs 110 would like to connect to 802.11 or handover from cellular to 802.11 for several reasons. Generally there is a larger bandwidth and higher data rate with 802.11. Assuming a WiFi hotspot 114 is located near the cell edge of a cell 104, then poor BS signal strength and hence poor spectral efficiency to support rich UEs (i.e., UEs with rich applications, or QoS/delay-aware traffic). Assuming a WiFi hotspot 114 is located close to the cell 104 center and the macro cell 104 is overloaded, then it still may be advantageous to divert some packets of some rich UEs to 802.11 so that BS 102 resources can be allocated to other cellular UEs 110 in the same cell. Further, the UE 110 may be, for some reason, a source of high interference in the uplink to macro UEs 110 in other cells 104.

An embodiment protocol reserves resources to QoS-sensitive UEs 110 (e.g., cellular UEs). There are two modes of MAC: default mode (e.g., DCF/EDCA), and QoS-aware mode. If there is no QoS-sensitive UE 110 (whose traffic is QoS-aware) in WiFi, the default mode of MAC is used to serve local UEs 108 and other QoS-insensitive UEs and stations.

Figure 2:
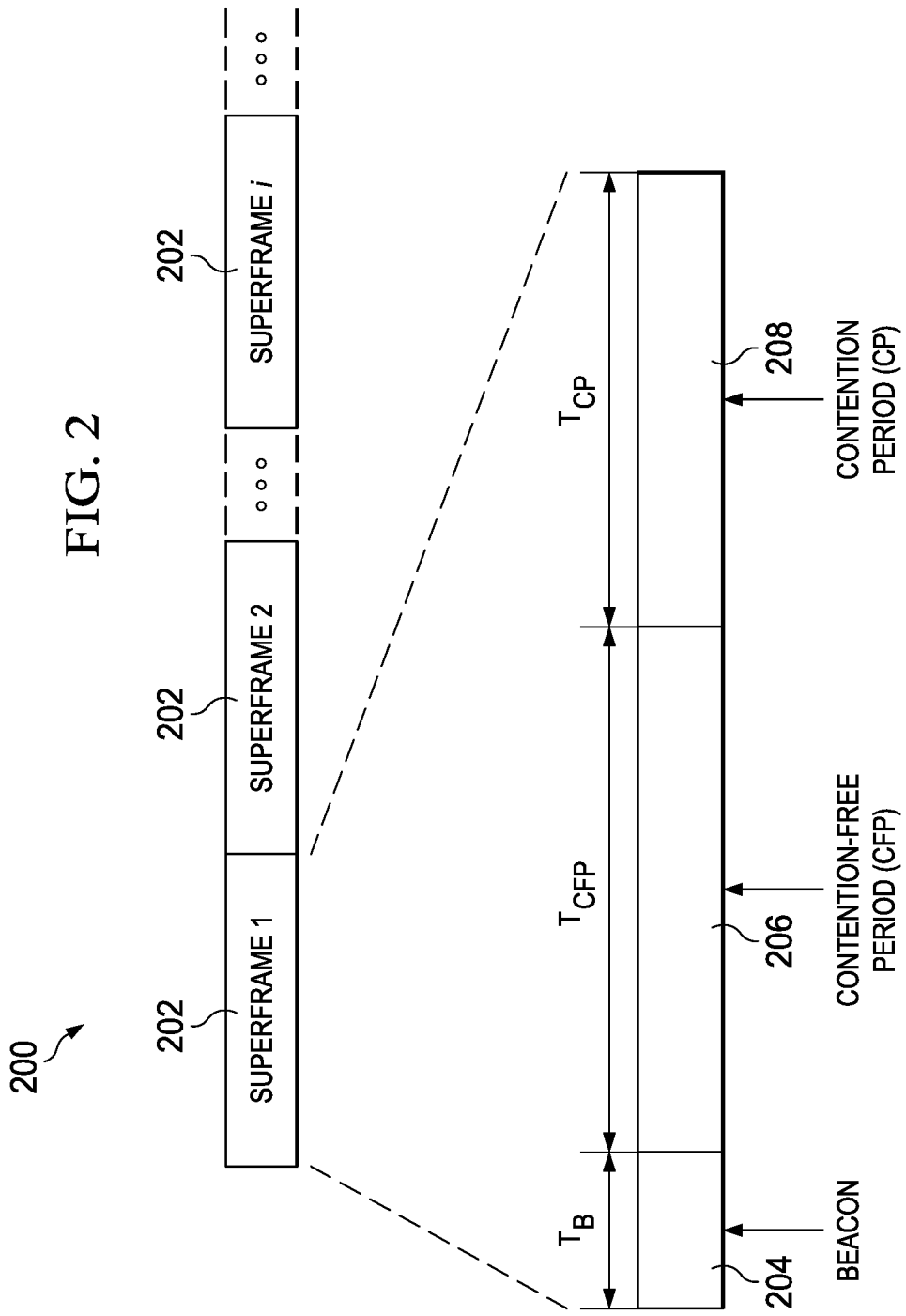
FIG. 2 is a schematic diagram of an embodiment of a system for time division for QoS provisioning of WiFi resources.

FIG. 2 is a schematic diagram of an embodiment of a system 200 for time division for QoS provisioning of WiFi resources. If there is a QoS-sensitive UE in WiFi, a QoS-aware mode of MAC can be triggered, where time is divided in super-frames 202. The duration of different super-frames 202 may be different. Each super-frame 202 includes a beacon phase 204, a contention-free phase 206 (for QoS-sensitive UEs 110), and a contention phase 208 (for local UEs 108 and QoS-insensitive UEs). The duration of a beacon phase 204 is constant, $T_B$. In an embodiment, the MAC and duration of in the contention-free phase 206, $T_{CFP}$, is based on the scheduled UEs and token-passing, where only a token holder is allowed to transmit. The duration of a contention phase 208, $T_{CP}$, depends on T (the duration of a super-frame 202) and $T_{CFP}$ (the duration of a contention-free phase 206). If there are no more QoS-sensitive UEs 110 in WiFi, the AP 106 can broadcast a "CHANGE" message and all the local UEs 108 and other QoS-insensitive UEs will follow the default mode of MAC.

Figure 3:
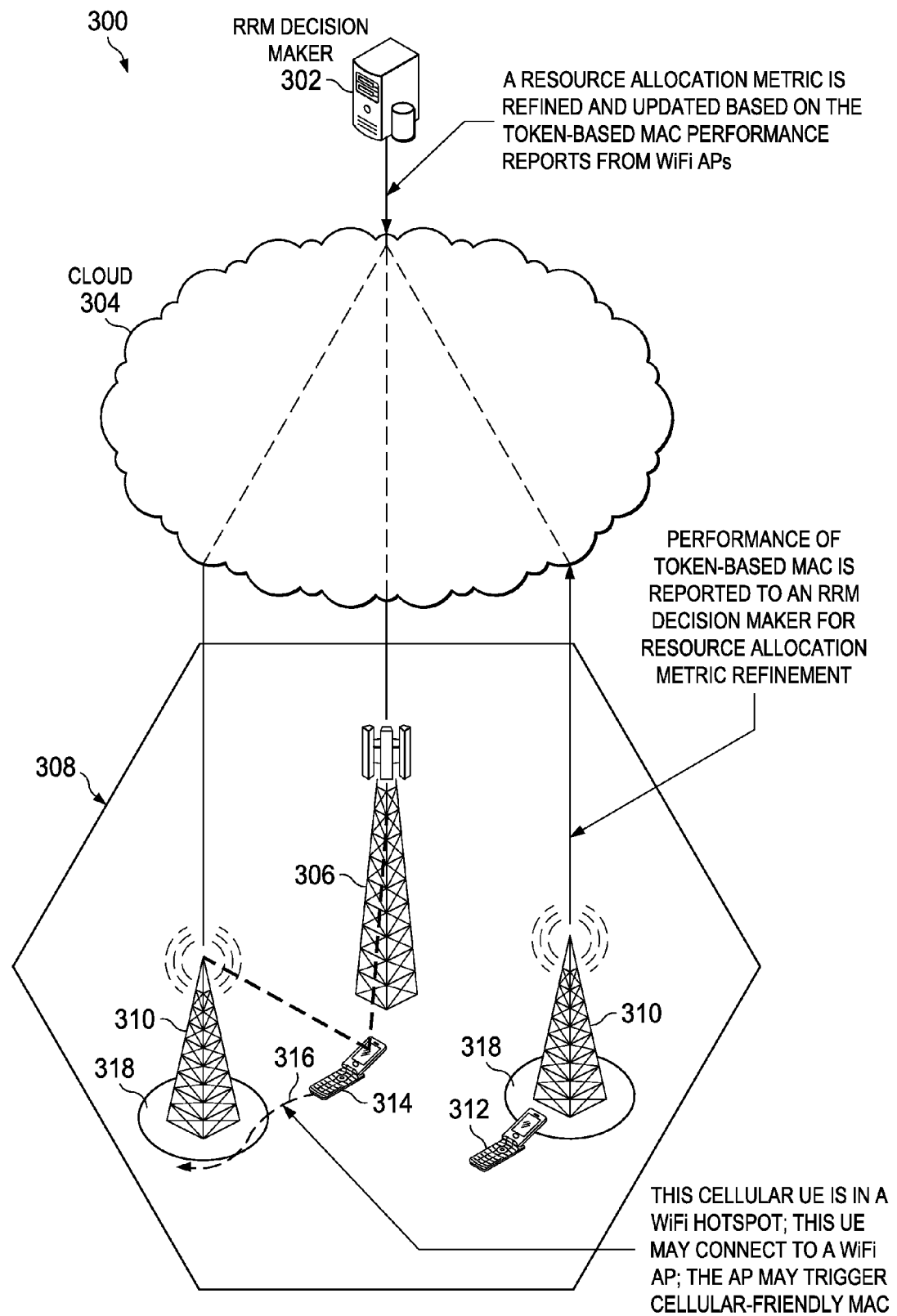
FIG. 3 illustrates an embodiment system for scheduling QoS-sensitive UEs in a LAN.

FIG. 3 illustrates an embodiment system 300 for scheduling QoS-sensitive UEs in a LAN. The system 300 includes a RRM server 302, a cloud 304 or network (e.g., a backhaul network), a BS 306, a cell 308, multiple wireless LAN APs 310 with associated coverage areas or hot spots 318, and QoS-sensitive UEs 312, 314. UE 314 travels a path 316 through the cell 308 and enters a WiFi hotspot 318. The BS 306 hands off the UE 314 to the AP 310 when the UE 314 enters the WiFi hotspot 318.

In an embodiment, when a QoS-sensitive UE 312, 314 joins an AP 310, the QoS-sensitive UE 312, 314 has to announce its presence. In a first method, some signaling message from the core network of a RAN, such as from RRM server 302, is sent to notify the AP 310. Call rejection (related to a QoS provisioning request) can be done in the core (e.g., at RRM server 302) or at the AP 310, and the QoS-sensitive UE 312, 314 can be treated as a local UE.

In a second method, the QoS-sensitive UE 312, 314 jams the common (control) channel, where the length of a jamming signal depends on its QoS metrics. This avoids two or more QoS-sensitive UEs 312, 314 from connecting to WiFi at the same time. After sending a jamming signal, the UE 312, 314 senses the channel. If the channel is sensed free (winner), the UE 312, 314 sends a "JOIN" message. Otherwise, the UE 312, 314 backs off by a constant duration, then retries. Other UEs (local UEs and QoS-insensitive UEs) listen to new frame configuration given in the beacon in the next super-frame.

The AP 310 calculates $T_{CFP}$ depending on the computational power of the AP 310, the traffic demands of this QoS-sensitive UE 312, 314 and other QoS-sensitive UEs, contract agreement with vendors/service providers of some radio access technology (e.g., cellular technology), etc. The AP 310 broadcasts a "CHANGE" message that includes the timing information of the beacon phase, the contention-free phase and the contention phase. This message also contains a token, announces a list of UEs in the contention-free phase, and identifies a token holder. Call rejection can be realized if the list of UEs in the contention-free phase does not include this UE 312, 314; and this UE 312, 314 is treated as a local UE as resulting from a poor handover decision.

For a scheduled mechanism based on token passing, an AP 310 computes the number of potential token holders, determines a token passing mechanism, identifies the current token holder, the beginning of CFP, and the beginning of CP, etc., and announces this information in the beacon message. Generally, only the token holder can transmit in the CFP (no contention). The number of token passing can be upper bounded (e.g., by an agreement between vendors/service providers of some radio access technology (e.g., cellular technology) and WiFi vendors/service providers on how many resources would be reserved, past QoE histories, loading, traffic patterns, etc.); once the tokens run out, and there is still some QoS-sensitive UE 312, 314 in the WiFi zone, those UEs 312, 314 are considered to be local UEs, and the AP 310 broadcasts a "CHANGE" message and all the (local) UEs follow the default mode of MAC.

Tokens can be passed according to a deterministic sequence specified in the beacon message. Tokens can also be passed according to a certain probability (e.g., queuing status, QoS requirements, etc.). As an example with equal probability, there are $N_k$ nodes belonging to the contention-free phase (including QoS-sensitive UEs 312, 314 and the AP 310 itself) in the hotspot k. The token passing probability from UE j to UE I can be given by Pij=1/($N_k$) and $$\sum_{i=1}^{N_k} P_{ij} = 1, \forall j$$

A contention-free phase $T_{CFP}$ can be further divided into the DL phase and UL phase, where the duration of each of these phases depends on the QoS requirements of the QoS-sensitive UE(s) 312, 314 and/or the maximum number of QoS-sensitive UEs 312, 314 to be supported. If the current token holder does not transmit for a certain duration t (e.g., decided to stop the application, battery drained, received an RTS/CTS from other nodes, already left, etc.), the AP 310 issues a "REMINDER" message. This is repeated for at most R times. If the current token holder still does not transmit, this token holder is considered as left, and AP 310 issues a new token to the next token holder according to a predefined token passing mechanism. Note that a "token" can be piggybacked to a packet.

In case it does not have data to send, a token holder may send a zero payload packet. A token can refer to one transmission opportunity, a fixed amount of data that can be transmitted in each channel access, a fixed amount of air time occupied in each transmission, etc.

An AP 310 or each QoS-sensitive UE 312, 314 keeps track of how many tokens are assigned. A virtual token arrival process may be generated by an AP 310 or each QoS-sensitive UE 312, 314, which may generate all the tokens for each QoS-sensitive UE 312, 314 at once, at a constant rate, according to certain probability distributions (e.g., based on traffic patterns, QoS requirements, etc.), etc.

When a QoS-sensitive UE 312, 314 leaves an AP 310, the QoS-sensitive UE 312, 314 can proactively notify the AP 310 by jamming the common (control) channel, and sending a "LEAVE" message after sensing the channel idle. Or the QoS-sensitive UE 312, 314 can simply leave and the AP 310 will find out later. In any case, the AP 310 will re-calculate $T_{CFP}$ and announce the changes in the next beacon.

FIG. 3 also shows inter-RAT RRM/handover, which can be improved with performance feedback.

The number of tokens per each QoS-sensitive UE 312, 314 can be upper bounded (e.g., an agreement between vendors/service providers of some radio access technology (e.g., cellular technology) and WiFi vendors/service providers on how much resources would be reserved for this UE). If the tokens for this UE 312, 314 run out and this UE 312, 314 is still in the WiFi zone 318, this UE will be changed to a "local UE" and the AP 310 will ignore this UE in the token passing mechanism in the next beacon broadcast message.

The number of token passing times and/or the total air times for CFPs within a predefined time window can also be upper bounded for a given time frame (e.g., an agreement between vendors/service providers of some radio access technology (e.g., cellular technology) and WiFi vendors/service providers on how much resources would be reserved purely for QoE provisioning). If all the reserved resources have run out for that particular time frame, and there is still some QoS-sensitive UE 312, 314 in the WiFi zone 318, all of those UEs 312, 314 are considered to be local UEs, and the AP 310 will broadcast a "CHANGE" message and all the (local) UEs will follow the default mode of MAC. Any newly connected QoS-sensitive UEs 312, 314 within that predefined time window will be considered "local UEs" and will contend for channel access following the default MAC mode of operation.

Also, if tokens run out, it is likely that the resource allocation/handover mechanism (e.g., metric evaluation) is not good. The AP 310 informs a radio resource management (RRM) decision maker (e.g., RRM server 302) of how long these QoS-sensitive UEs 312, 314 are in its WiFi zone, their QoS classes/traffic types, their QoS performances, mobility patterns, etc. An RRM decision maker (e.g., RRM server 302) updates its RRM strategy and may trigger a new RRM policy to this UE 312, 314 (e.g., to drop the WiFi connection).

If the number of tokens and/or the total air times for CFPs are more than necessary (e.g., many zero-payload packet transmissions), this means QoS for QoS-sensitive UEs 312, 314 is generally over-provisioned, which causes resource underutilization at WiFi APs 310. WiFi APs 310 will report this to an RRM decision maker (e.g., RRM server 302). They may actively adjust $T_{CFP}$ and $T_{CP}$ depending on their capability (e.g., computational complexity, energy consumption constraints, etc.).

Figure 4:
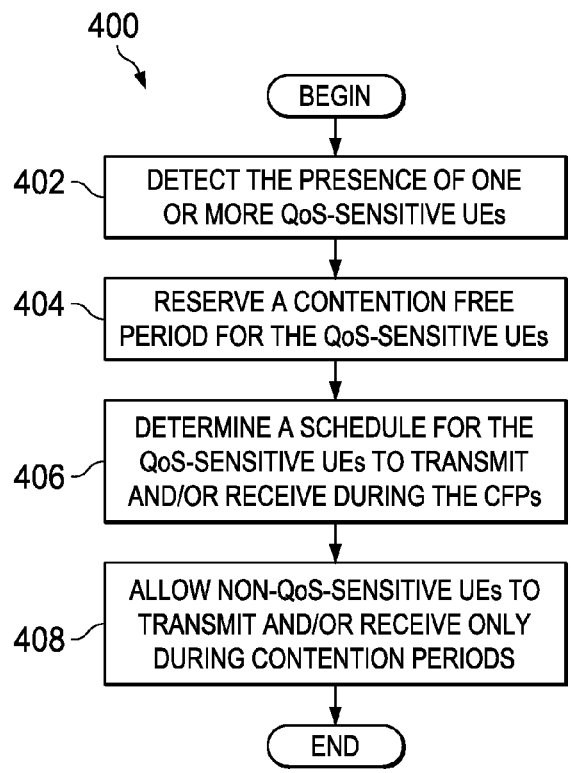
FIG. 4 is a flowchart of an embodiment method for scheduling QoS-sensitive UEs in a wireless LAN.

FIG. 4 is a flowchart of an embodiment method 400 for scheduling QoS-sensitive UEs in a wireless LAN. The method 400 begins at block 402 where an AP or other device detects the presence of one or more QoS-sensitive UEs. At block 404, the AP reserves the CFP for the QoS-sensitive UEs. Only QoS-sensitive UEs may broadcast during the CFP. At block 406, the AP determines a schedule for each of the QoS-sensitive UEs to transmit and/or receive during the CFP. Some QoS-sensitive UEs may have a larger portion of the CFP based on the differing QoS requirements of different UEs. At block 408, the AP allows non-QoS-sensitive UEs (e.g., local UEs) to transmit and/or receive only during the contention periods, after which, the method 400 may end.

Figure 5:
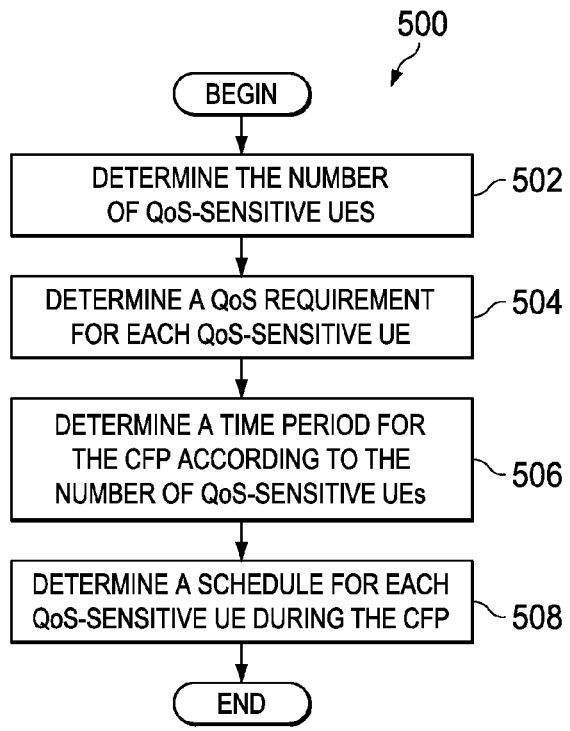
FIG. 5 is a flowchart of an embodiment method 500 for QoS-sensitive scheduling in a wireless LAN.

FIG. 5 is a flowchart of an embodiment method 500 for QoS-sensitive scheduling in a wireless LAN. The method 500 begins at block 502 where an AP determines the number of QoS-sensitive UEs in the wireless LANs coverage area (e.g., a WiFi hotspot). At block 504, the AP or a RRM decision maker determines the QoS requirements for each QoS-sensitive UE. At block 506, the AP determines a time period to allocate to the CFP in a superframe according to the number of QoS-sensitive UEs and, in an embodiment, according to the QoS requirements of the QoS-sensitive UEs. At block 508, the AP determines a schedule for each QoS-sensitive UE during the CFP.

Figure 6:
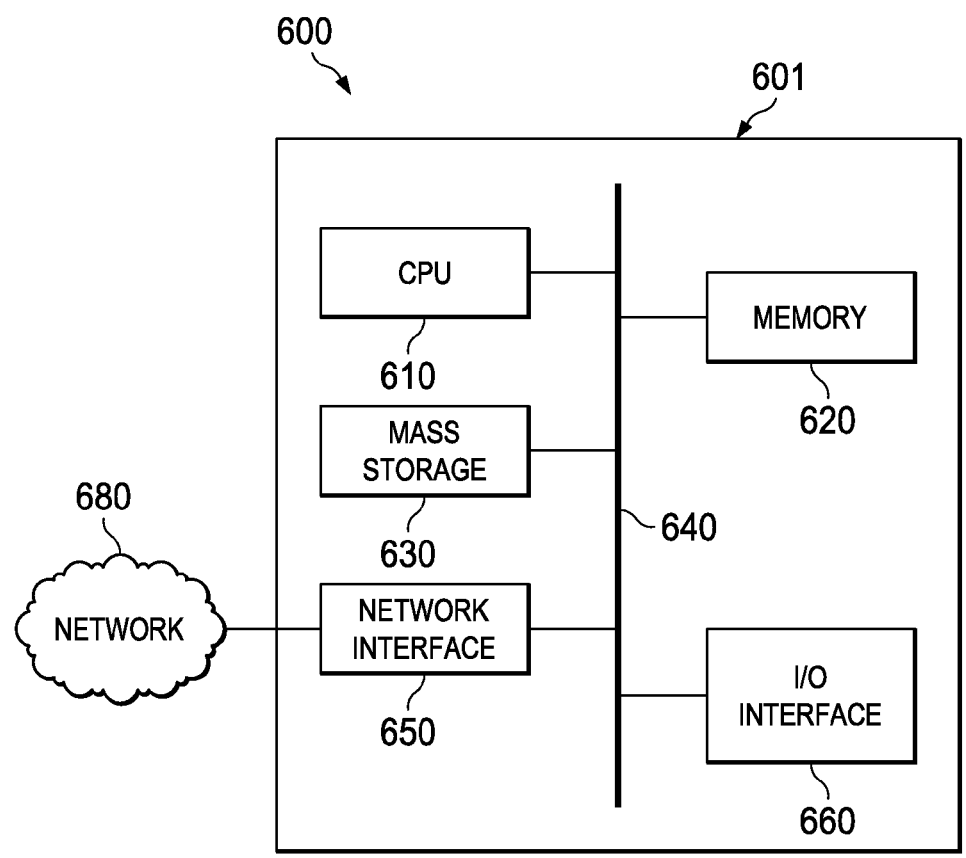
FIG. 6 is a processing system that can be used to implement various embodiments.

FIG. 6 is a block diagram of a processing system 600 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 600 may comprise a processing unit 601 equipped with one or more input/output devices, such as a speaker, microphone, mouse, touchscreen, keypad, keyboard, printer, display, and the like. The processing unit 601 may include a central processing unit (CPU) 610, memory 620, a mass storage device 630, a network interface 650, and an I/O interface 660 connected to a bus 640.

The bus 640 may be one or more of any type of several bus architectures including a memory bus or memory controller, a peripheral bus, video bus, or the like. The CPU 610 may comprise any type of electronic data processor. The memory 620 may comprise any type of system memory such as static random access memory (SRAM), dynamic random access memory (DRAM), synchronous DRAM (SDRAM), read-only memory (ROM), a combination thereof, or the like. In an embodiment, the memory 620 may include ROM for use at boot-up, and DRAM for program and data storage for use while executing programs.

The mass storage device 630 may comprise any type of storage device configured to store data, programs, and other information and to make the data, programs, and other information accessible via the bus 640. The mass storage device 630 may comprise, for example, one or more of a solid state drive, hard disk drive, a magnetic disk drive, an optical disk drive, or the like.

The I/O interface 660 may provide interfaces to couple external input and output devices to the processing unit 601. The I/O interface 660 may include a video adapter. Examples of input and output devices may include a display coupled to the video adapter and a mouse/keyboard/printer coupled to the I/O interface. Other devices may be coupled to the processing unit 601, and additional or fewer interface cards may be utilized. For example, a serial interface such as Universal Serial Bus (USB) (not shown) may be used to provide an interface for a printer.

The processing unit 601 may also include one or more network interfaces 650, which may comprise wired links, such as an Ethernet cable or the like, and/or wireless links to access nodes or different networks. The network interface 601 allows the processing unit to communicate with remote units via the networks 680. For example, the network interface 650 may provide wireless communication via one or more transmitters/transmit antennas and one or more receivers/receive antennas. In an embodiment, the processing unit 601 is coupled to a local-area network or a wide-area network for data processing and communications with remote devices, such as other processing units, the Internet, remote storage facilities, or the like.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method for provisioning quality of service (QoS)-sensitive devices in a wireless local area network (LAN), the method comprising:
   determining that at least one QoS-sensitive device is communicating with a wireless LAN access point (AP);
   reserving a contention free period (CFP) in a superframe for the at least one QoS-sensitive device to communicate with the AP;
   allocating a contention period (CP) in the superframe for non-QoS-sensitive devices to communicate with the AP; and
   reassigning a QoS-sensitive device configured to communicate during the CFP to communicate during the CP when a new QoS-sensitive device joins the wireless LAN, wherein the new QoS-sensitive device comprises a higher priority QoS,
   wherein the non-QoS-sensitive devices are prohibited from transmitting during the CFP.

2. The method of claim 1, further comprising determining a time duration for the CFP.

3. The method of claim 2, wherein the time duration for the CFP is determined according to a number of QoS-sensitive devices, cellular user equipment (UE), or both.

4. The method of claim 2, wherein the time duration for the CFP is determined according to QoS requirements for the QoS-sensitive devices.

5. The method of claim 1, further comprising:
assigning a newly joining QoS-sensitive device to communicate during the CP when a number of QoS-sensitive devices in a coverage area for the AP exceeds a maximum.

6. The method of claim 1, wherein the AP comprises an Institute of Electrical and Electronics Engineers (IEEE) 802.11 enabled AP.

7. The method of claim 1, wherein the QoS-sensitive devices are cellular devices.

8. The method of claim 1, further comprising:
determining a transmission schedule for a first one of the devices in a wireless LAN coverage area, wherein the transmission schedule specifies whether the first one of the devices transmits during the CFP or the CP.

9. The method of claim 8, wherein the first one of the devices transmits during the CFP and wherein the transmission schedule specifies a time within the CFP for the first one of the devices to transmit.

10. The method of claim 8, wherein determining a transmission schedule further comprises:
determining a respective token for the first one of the devices; and
transmitting the respective token to the first one of the devices,
wherein the respective token specifies whether the first one of the devices transmits during the CFP or the CP.

11. The method of claim 10, wherein the first one of the devices is a first QoS-sensitive device and further comprising:
transmitting an information message to a radio resource management (RRM) manager, wherein the information message comprises performance of the first QoS-sensitive device, token information, and total duration of CFPs.

12. The method of claim 11, further comprising:
receiving an updated RRM strategy from the RRM manager, wherein the updated RRM strategy is determined by the RRM manager according to the information message.

13. The method of claim 12, further comprising forwarding the updated RRM strategy to the first QoS-sensitive device.

14. A network component configured provisioning quality of service (QoS)-sensitive devices in a wireless local area network (LAN), comprising:
a processor; and
a computer readable storage medium storing programming for execution by the processor, the programming including instructions to:
determine that at least one QoS-sensitive device is communicating with a wireless LAN access point (AP);
reserve a contention free period (CFP) in a superframe for the at least one QoS-sensitive device to communicate with the AP;
allocate a contention period (CP) in the superframe for non-QoS-sensitive devices to communicate with the AP; and
reassign a QoS-sensitive device configured to communicate during the CFP to communicate during the CP when a new QoS-sensitive device joins the wireless LAN, wherein the new QoS-sensitive device comprises a higher priority QoS,
wherein the non-QoS-sensitive devices are prohibited from transmitting during the CFP.

15. The network component of claim 14, wherein the programming further comprise instructions to determine a time duration for the CFP.

16. The network component of claim 15, wherein the time duration for the CFP is determined according to a number of QoS-sensitive devices.

17. The network component of claim 15, wherein the time duration for the CFP is determined according to QoS requirements for the QoS-sensitive devices.

18. The network component of claim 14, wherein the programming further comprises instructions to assign a newly joining QoS-sensitive device to communicate during the CP when a number of QoS-sensitive devices in a coverage area for the AP exceeds a maximum.

19. The network component of claim 14, wherein the AP comprises an Institute of Electrical and Electronics Engineers (IEEE) 802.11 enabled AP.

20. The network component of claim 14, wherein the QoS-sensitive devices are cellular devices.

21. The network component of claim 14, wherein the programming further comprises instructions to:
determine a transmission schedule for a first one of the devices in a wireless LAN coverage area, wherein the transmission schedule specifies whether the first one of the devices transmits during the CFP or the CP.

22. The network component of claim 21, wherein the first one of the devices transmits during the CFP and wherein the transmission schedule specifies a time within the CFP for the first one of the devices to transmit.

23. The network component of claim 21, wherein the programming further comprises instructions to:
determine a respective token for the first one of the devices; and
transmit the respective token to the first one of the devices,
wherein the respective token specifies whether the first one of the devices transmits during the CFP or the CP.

24. The network component of claim 23, wherein the first one of the devices is a first QoS-sensitive device and wherein the programming further comprises instructions to transmit an information message to a radio resource management (RRM) manager, wherein the information message comprises performance of a first QoS-sensitive device, token information, and total duration of CFPs.

25. The network component of claim 24, wherein the programming further comprises instructions to receive an updated RRM strategy from the RRM manager, wherein the updated RRM strategy is determined by the RRM manager according to the information message.

26. The network component of claim 25, wherein the programming further comprises instructions to forward the updated RRM strategy to the first QoS-sensitive device.

27. A method for provision quality of cellular user experience (QoE) in a wireless local area network (LAN), the method comprising:
scheduling a cellular device to transmit/receive data to/from an access point (AP) of the wireless LAN during a contention free period (CFP);
scheduling a non-cellular device to transmit/receive to/from the access point only during a contention period (CP); and
reassign the cellular device configured to communicate during the CFP to communicate during the CP when a new cellular device joins the wireless LAN, wherein the new cellular device comprises a higher priority QoS than the cellular device.

28. The method of claim 27, further comprising determining a time duration for the CFP.

29. The method of claim 28, wherein the time duration for the CFP is determined according to a number of cellular devices in a coverage area of the wireless LAN.

30. The method of claim 28, wherein the time duration for the CFP is determined according to quality of service (QoS) requirements for the cellular devices.

31. The method of claim 27, wherein the AP comprises an Institute of Electrical and Electronics Engineers (IEEE) 802.11 enabled AP.

* * * * *